United States Patent
Ito et al.

(10) Patent No.: US 10,029,571 B2
(45) Date of Patent: Jul. 24, 2018

(54) ELECTRIC WORK VEHICLE

(71) Applicant: Kubota Corporation, Osaka-shi (JP)

(72) Inventors: Hirokazu Ito, Sakai (JP); Kazuaki Matsuda, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/336,074

(22) Filed: Oct. 27, 2016

(65) Prior Publication Data

US 2017/0120755 A1    May 4, 2017

(30) Foreign Application Priority Data

Oct. 29, 2015    (JP) .................................. 2015-213093

(51) Int. Cl.
| | | |
|---|---|---|
| *B60L 3/10* | (2006.01) | |
| *G01C 19/5776* | (2012.01) | |
| *B60L 15/20* | (2006.01) | |

(52) U.S. Cl.
CPC ............ *B60L 3/10* (2013.01); *B60L 15/2036* (2013.01); *G01C 19/5776* (2013.01); *B60L 2200/40* (2013.01); *B60L 2220/42* (2013.01); *B60L 2220/46* (2013.01); *B60L 2240/465* (2013.01)

(58) Field of Classification Search
CPC ............ B60L 15/2036; B60L 2200/40; B60L 2220/42; B60L 2220/46; B60L 2240/465; B60L 3/10; G01C 19/5776
USPC ..................................................... 701/22, 50
See application file for complete search history.

(56) References Cited

U.S. PATENT DOCUMENTS

| | | | | | |
|---|---|---|---|---|---|
| 5,524,079 | A * | 6/1996 | Ishida | .................... | B62D 7/159 180/412 |
| 7,017,327 | B2 * | 3/2006 | Hunt | .................... | B60W 10/08 56/14.7 |
| 7,181,326 | B2 * | 2/2007 | Lin | ........................ | B62D 5/008 180/443 |
| 8,490,722 | B2 * | 7/2013 | Koga | ................... | B62D 11/003 180/6.28 |
| 8,849,537 | B2 * | 9/2014 | Yoon | ..................... | B60W 30/02 701/1 |
| 2006/0048976 | A1 * | 3/2006 | Deguchi | ............. | B60L 15/2036 180/6.5 |
| 2006/0136112 | A1 * | 6/2006 | Lin | ........................ | B62D 5/008 701/70 |
| 2009/0260901 | A1 * | 10/2009 | Ishii | ........................ | A01D 34/78 180/6.5 |

(Continued)

FOREIGN PATENT DOCUMENTS

JP            201275254 A    4/2012

*Primary Examiner* — Tyler J Lee
(74) *Attorney, Agent, or Firm* — The Webb Law Firm

(57) ABSTRACT

An electric work vehicle includes a left motor which supplies rotating power to a left drive wheel, a right motor which supplies rotating power to a right drive wheel, a motor control unit which provides drive signals to the left motor and the right motor independently of each other in response to an operation relative to a steering operation unit, a yaw rate detector which detects an actual yaw rate of a vehicle body, an arithmetic yaw rate computing unit which derives an arithmetic yaw rate based on a rotating speed of the left motor or the left drive wheel and a rotating speed of the right motor or the right drive wheel, and a slip detection unit detecting occurrence of slipping based on the arithmetic yaw rate and an actual yaw rate.

7 Claims, 4 Drawing Sheets

(56) References Cited

U.S. PATENT DOCUMENTS

| | | | | |
|---|---|---|---|---|
| 2010/0114433 A1* | 5/2010 | Lewis | .................... | A61G 5/045 |
| | | | | 701/41 |
| 2011/0127093 A1 | 6/2011 | Koga et al. | | |
| 2016/0090004 A1* | 3/2016 | Ienaga | ................ | B60L 15/2036 |
| | | | | 701/22 |
| 2017/0057494 A1* | 3/2017 | Sato | ...................... | B60W 10/08 |
| 2017/0232848 A1* | 8/2017 | Lian | ........................ | B60L 3/102 |
| | | | | 701/22 |

* cited by examiner

ELECTRIC WORK VEHICLE

CROSS REFERENCE TO RELATED APPLICATION

This application claims priority to Japanese Patent Application No. 2015-213093 filed Oct. 29, 2015, the disclosure of which is hereby incorporated in its entirety by reference.

BACKGROUND OF THE INVENTION

1. Technical Field of the Invention

The present disclosure relates to an electric work vehicle including a pair of right and left drive wheels driven independently of each other by the a pair of right and left motors, respectively.

2. Description of the Related Art

JP 2012-075254 A discloses an electric lawn mower (one example of electric work vehicle) which includes a pair of right and left front drive wheels; a motor which distributes rotating drive power to a pair of right/left front drive wheels; a first sensor for detecting a rotating speed of the motor; and a second sensor for detecting a current value of electric current through the motor. In the conventional electric lawn mower, it is determined whether at least one of the wheel is slipping or not based on detection results from at least one of the first sensor and the second sensor. When it is determined that the wheel is slipping, control is performed to reduce torque of the motor. Such behavior contains the wheel slipping to prevent damage on the lawn.

The lawn mower in JP 2012-075254 A is configured to detect slipping based on a change in rotating speed or current value of the motor. The slipping is easily detected if the wheel revolves without making contact with the ground based on significant change in the rotating speed or the current value of the motor. On the other hand, the accuracy of slip detection decreases if the wheel slips or spins around due to a load caused by grass or mud to only slightly change the rotating speed or the current value of the motor.

Under the circumstances, there is a growing demand for providing a technique for properly detecting wheel slipping in an electric work vehicle including a pair of right and left drive wheels driven independently of each other by a pair of right and left motors, respectively.

SUMMARY OF THE INVENTION

According to the present disclosure, an electric work vehicle comprises:

a vehicle body including a steering operation unit;

a left motor which supplies rotating power to a left drive wheel supporting the vehicle body to the ground;

a right motor which supplies rotating power to a right drive wheel supporting the vehicle body to the ground;

a motor control unit which provides drive signals to the left motor and the right motor independently of each other in response to an operation relative to the steering operation unit;

a yaw rate detector which detects an actual yaw rate of the vehicle body;

an arithmetic yaw rate computing unit which derives an arithmetic yaw rate based on a rotating speed of the left motor or the left drive wheel and a rotating speed of the right motor or the right drive wheel; and a slip detection unit detecting occurrence of slipping based on the arithmetic yaw rate and an actual yaw rate.

The work vehicle with such an arrangement produces a difference in rotating speed between the right and left motors and thus between the right and left drive wheels to turn its direction. If the drive wheel slips during turning operation, a ground propelling force (a force for grabbing the ground to move the vehicle) of the slipping wheel reduces to cause the vehicle to turn at a yaw rate that is different from a theoretical yaw rate. More particularly, occurrence of slipping produces a difference between a calculative or theoretical, arithmetic yaw rate of the vehicle body obtained based on rotating speed of the right and left motors and thus of the right and left drive wheels and an actual yaw rate of the vehicle detected by the yaw rate detector or any other detector. When the vehicle moves straight, the right and left motors are driven at the same rotating speed. If one of the drive wheels slips during the straight movement, the ground propelling force of the slipping wheel also reduces to cause the vehicle to actually yaw toward the slipping wheel even if the theoretical yaw rate is zero (the actual yaw rate is not zero). In view of this, it is possible to detect slipping of the drive wheel and also to estimate a slipping amount. When wheel slipping is detected, a warning is generated for informing the driver of occurrence of slipping or some countermeasures such as motor control are taken to contain the slipping. The detection unit has already been provided to detect the rotating speed of the right and left drive wheels and thus the right and left motors for motor control. Therefore, simply adding the yaw rate detector with proper built-in computer programs allows slipping to be detected.

One of easy ways to detect occurrence of slipping based on a difference between the arithmetic yaw rate and the actual yaw rate is to find such a difference first and then compare the difference with a threshold that has been predetermined through experiments, for example. As such, in one preferred embodiment, the slip detection unit is configured to compute a difference between the actual yaw rate and the arithmetic yaw rate; and determines that slipping occurs if the difference is equal to or greater than an upper threshold.

The yaw rate represents a rate of yawing (swinging motion of the vehicle body about a vertical axis) per hour, and thus a value of the rate showing the direction of the vehicle body has a plus or minus sign. Therefore, it is possible to specify, based on the sign (plus or minus) of the difference between the actual yaw rate and the arithmetic yaw rate, which of the right and left drive wheels fails to properly transmit rotation of the wheel to the ground, that is, which of the drive wheels slips. As such, in one preferred embodiment, the slip detection unit is configured to specify which of the drive wheels slips based on a sign of the difference between the actual yaw rate and the arithmetic yaw rate. Such an arrangement advantageously specifies which of the drive wheels slip by simply finding the actual yaw rate and the arithmetic yaw rate and calculating the difference therebetween.

When both the left drive wheel and the right drive wheel slip to substantially the same degree, that is, slipping occurs in both of the wheels, the vehicle speed changes but yawing hardly occurs. Thus, slipping cannot be detected based on the raw rate. In such a situation, the slipping of both the wheels is detected by referring to driving states of the left drive wheel and the right drive wheel and to an actual change in speed of the vehicle body. In one preferred embodiment, when the actual yaw rate and the arithmetic yaw rate are below a lower threshold (that is, when the vehicle is intended to substantially move straight), the slip detection unit determines that both the left drive wheel and the right drive wheel slip based on detection results from an acceleration sensor which detects acceleration of the vehicle body.

If one of the drive wheels slips when the vehicle usually travels, the ground propelling force of the slipping wheel reduces to produce a difference between the arithmetic yaw rate and the actual yaw rate. On the other hand, if the driver attempts to move the vehicle straight on a sloping ground with the left drive wheel and the right drive wheel being driven at the same rotating speed, a difference is also produced between the arithmetic yaw rate and the actual yaw rate by the influence of gravity acceleration. In view of this, it is also possible to determine that the work vehicle moves on the sloping ground. In one embodiment, therefore, the slip detection unit determines that the electric work vehicle travels on a sloping ground if the actual yaw rate exceeds the arithmetic yaw rate.

These and other features and advantages resulting therefrom will become apparent upon review of the following detailed description of the embodiments when taken in conjunction with the drawings.

DETAILED DESCRIPTION OF PREFERRED EMBODIMENTS

Figure 1:
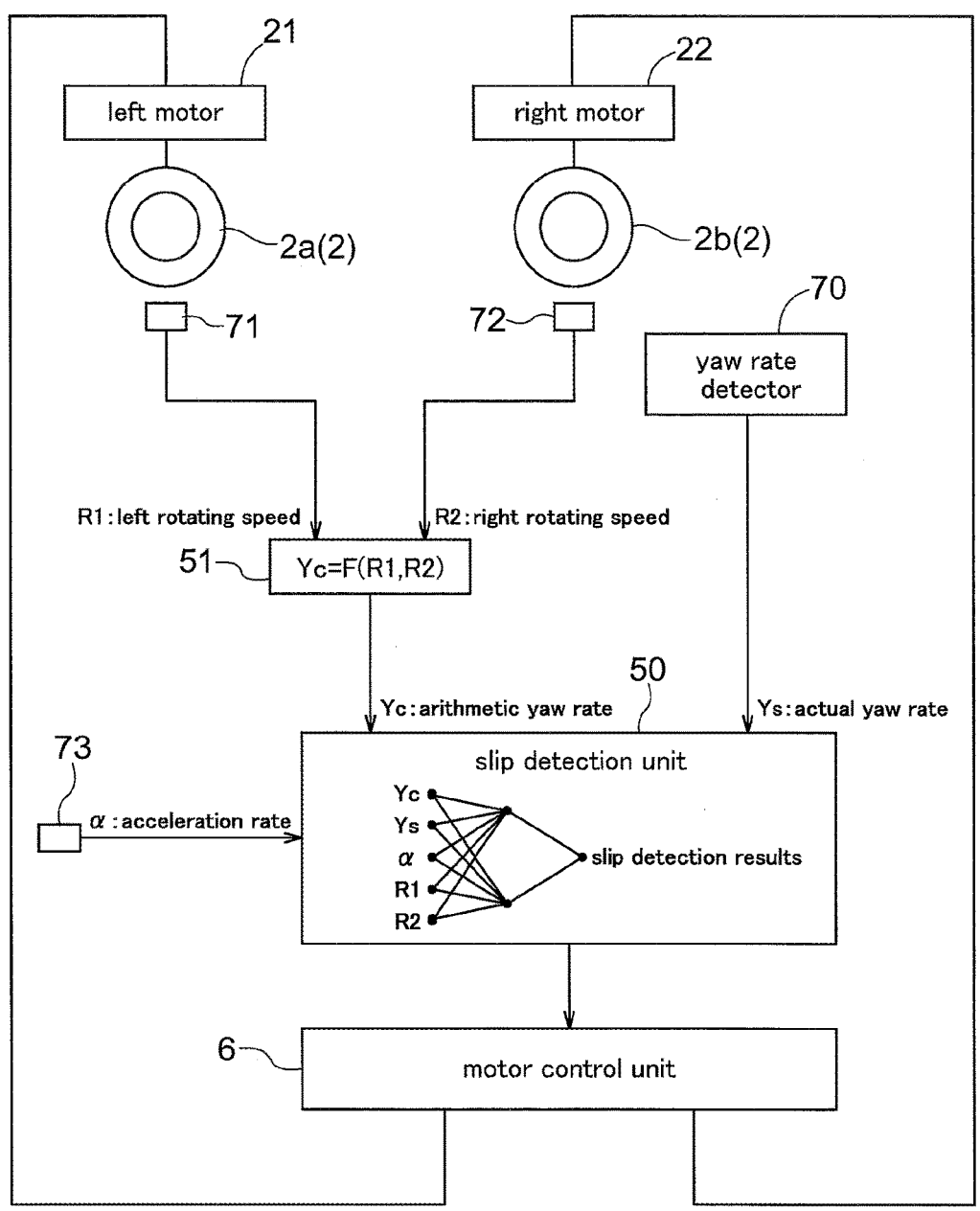
FIG. 1 is an explanatory representation of the present disclosure, showing a fundamental principle of slip detection which is applied to an electric work vehicle.

Before proceeding to detailed description of preferred embodiments, a fundamental principle of slip detection applied to the present disclosure will be described with reference to FIG. 1.

An electric work vehicle (referred to as "work vehicle" or "vehicle" also hereinafter) includes a left motor 21 supplying rotating drive power to a left drive wheel 2*a*, and a right motor 22 supplying rotating drive power to a right drive wheel 2*b*. A motor control unit 6 transmits drive signals, which have been produced independently of each other in response to steering operation performed by the driver, to the left motor 21 and the right motor 22. On receiving the drive signals, the left motor 21 and the right motor 22 are driven to rotate the left drive wheel 2*a* and the right drive wheel 2*b* to propel the vehicle. The driver may freely turn the vehicle by producing a difference in rotating speed between the left drive wheel 2*a* and the right drive wheel 2*b*. For example, the driver may rotate the left drive wheel at a lower speed than the right drive wheel to turn the vehicle left, and rotate the left drive wheel at a higher speed than the right drive wheel to turn the vehicle right.

A detection system includes a left rotation-detection unit detecting rotating speed of the left motor 21 and thus of the left drive wheel 2*a*, and a right rotation-detection unit detecting rotating speed of the right motor 22 and thus of the right drive wheel 2*b*. The rotating speed of the left motor 21 or the left drive wheel 2*a* will be referred to as "left-wheel rotating speed," and the rotating speed of the right motor 22 or the right drive wheel 2*b* will be referred to as "right-wheel rotating speed" hereinafter. Typically, the motor control unit 6 uses the left-wheel rotating speed and the right-wheel rotating speed to control the rotating speed of the left motor 21 and the right motor 22. The left-wheel rotating speed and the right-wheel rotating speed are also used in an arithmetic yaw rate computing unit 51 for computing a theoretical, arithmetic yaw rate.

The arithmetic yaw rate computing unit 51 functions to derive the arithmetic yaw rate based on the left-wheel rotating speed and the right-wheel rotating speed. More particularly, the arithmetic yaw rate computing unit 51 uses Conversion Formula F:

$$Yc=F(R1,R2)$$

where R1 is left-wheel rotating speed, R2 is right-wheel rotating speed, and Yc is arithmetic yaw rate. Conversion Formula F is obtainable through experiments, for example, and is built in the arithmetic yaw rate computing unit 51 in the form of function or table.

The detection system further includes a yaw rate detector 70 detecting actual yawing of the work vehicle around a center of a vehicle body to output an actual yaw rate, and a slip detection unit 50 detecting (estimating) slipping of the left drive wheel 2*a* or the right drive wheel 2*b*. The slip detection unit 50 receives the actual yaw rate detected by the yaw rate detector 70 and the arithmetic yaw rate obtained at the arithmetic yaw rate computing unit 51. Slipping of either one of the left drive wheel 2*a* and the right drive wheel 2*b* causes a difference in ground propelling force between the right drive wheel and the left drive wheel to turn the vehicle body by such a difference. Thus, the slip detection unit 50 detects occurrence of slipping. For example, the slip detection unit 50 determines that slipping occurs if a difference between the arithmetic yaw rate and the actual yaw rate exceeds a predetermined threshold. The slip detection unit 50 also calculates the difference between the arithmetic yaw rate and the actual yaw rate using a signed subtraction to specify which of the left drive wheel 2*a* and the right drive wheel 2*b* slips based on the sign resulting therefrom (i.e. plus or minus).

When slipping occurs in both of the left drive wheels 2*a* and the right drive wheels 2*b*, the ground propelling force reduces in both of the drive wheels. With no difference produced in propelling force between the right and left drive wheels, no slip is detected based on the difference in propelling force, and the vehicle speed simply decreases. To detect occurrence of slips on both of the left drive wheel 2*a* and the right drive wheel 2*b*, the vehicle body further includes an acceleration sensor 73 generating a detection signal (acceleration signal). The detection signal generated by the acceleration sensor 73 is transmitted to the slip detection unit 50. The slip detection unit 50 determines that slipping occurs in both of the left drive wheels 2*a* and the right drive wheels 2*b* if no difference or only a slight difference is detected between the arithmetic yaw rate and the actual yaw rate, and if speed reduction of the vehicle is detected while no shifting operation is performed.

The work vehicle such as a lawn mower usually travels at constant speed when the vehicle is engaged in the work associated therewith, and thus acceleration decreases before the vehicle travels at constant speed. More particularly, positive acceleration increases when the vehicle starts traveling and decreases when the vehicle is about to enter constant-speed movement, and negative acceleration occurs when the vehicle stops. Thus, a detection algorithm preferably incorporates a state of the work vehicle including states of operation devices such as a control lever, an acceleration lever or a brake lever to detect occurrence of slipping of both of the left drive wheel 2a and the right drive wheel 2b.

The slip detection unit 50 detects a slip by using elements such as Ys: actual yaw rate and Yc: arithmetic yaw rate, and optionally by using further elements such as α: acceleration rate, R1: left rotating speed and/or R2: right rotating speed if necessary. The slip detection unit 50 also may use a neural network built by tables or teachings that have been experimentally obtained, for example.

Next, an embodiment of the electric work vehicle using the fundamental principle for slip detection will be described hereinafter with reference to the accompanying drawings. In the illustrated embodiment, the electric work vehicle is a ride-on electric lawn mower (referred to as "lawn mower" hereinafter), which is also known as a zero-turn radius mower, including a mower unit 3 mounted on a vehicle body.

Figure 2:
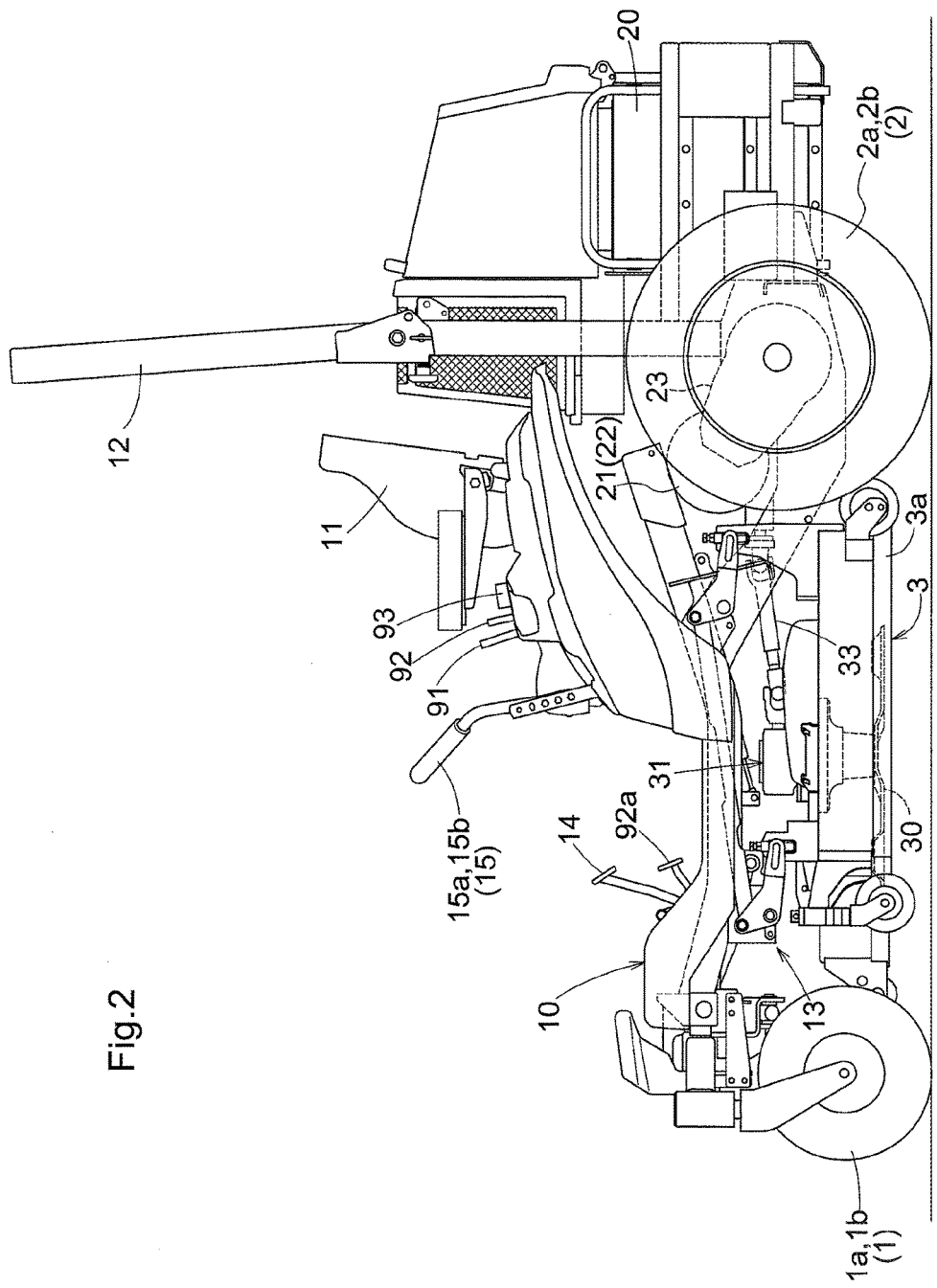
FIG. 2 is a side view of an electric lawn mower, an example of the electric work vehicle, according to one embodiment of the present disclosure.
Figure 3:
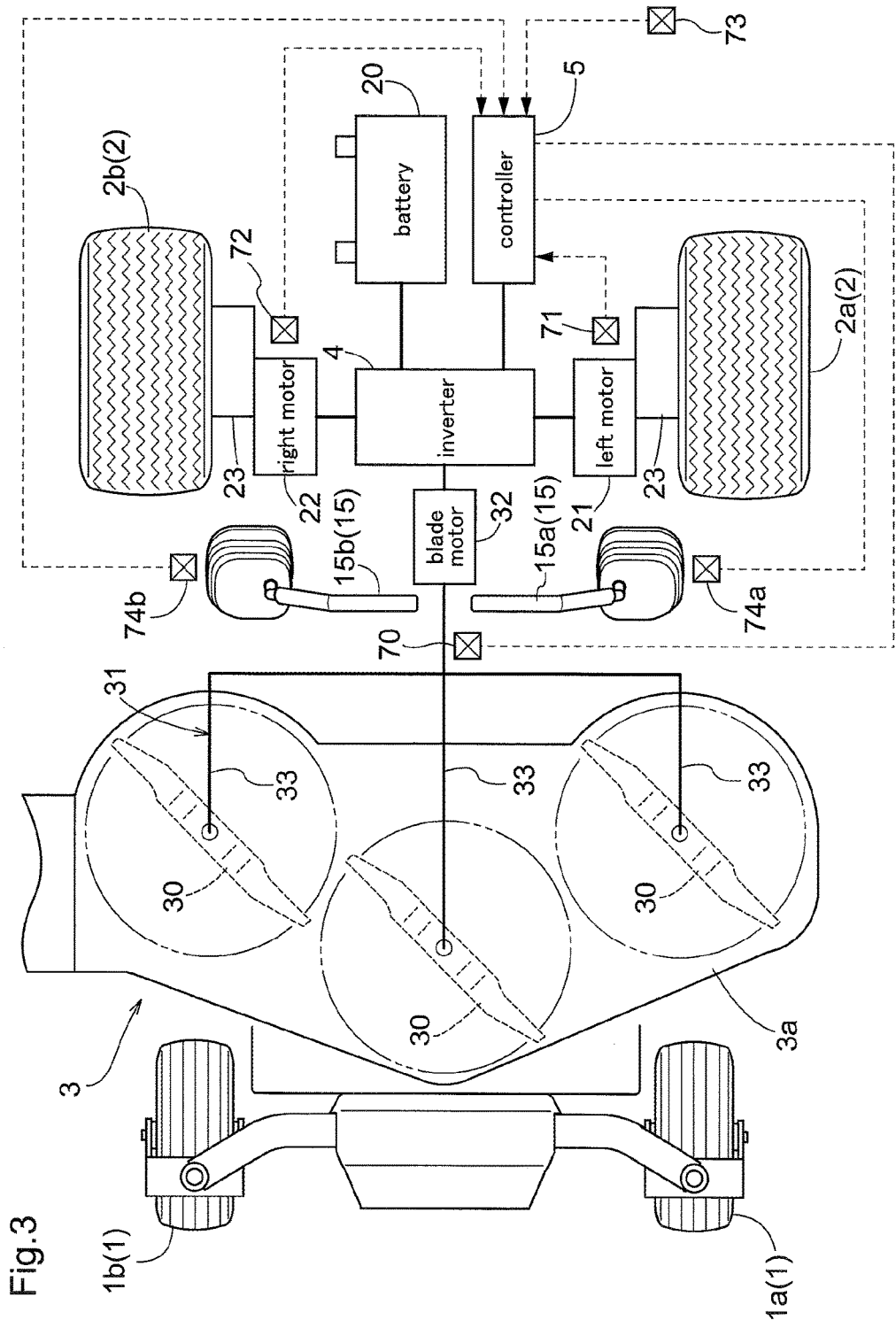
FIG. 3 is an explanatory representation showing an electrical system and a power transmission system of the electric lawn mower.

With reference to FIGS. 2 and 3, the lawn mower includes: a front wheel unit 1 consisting of a left front wheel 1a and a right front wheel 1b, acting as caster wheels; a rear wheel unit 2 consisting of a left drive wheel 2a and a right drive wheel 2b, acting as drive wheels; a vehicle body 10 supported by the front wheel unit 1 and the rear wheel unit 2; a battery 20 mounted rearward of the vehicle body 10; a driver's seat 11 provided forward from the battery 20; a roll-over protection structure 12 mounted upright rearward from the driver's seat 11, and a mower unit 3 suspended from the vehicle body 10 in a lower space of the vehicle body 10 between the front wheel unit 1 and the rear wheel unit 2 to be raised or lowered via a lift link mechanism acting as a lift device 13. In the illustrated embodiment, the lift link mechanism is raised or lowered by extending or contracting an electrically-driven lift cylinder acting as an electric actuator.

The lawn mower further includes: a floor plate provided forward of the driver's seat 11 to act as a foot rest for the driver; a brake pedal 14 projecting from the floor plate; and a steering device unit 15 including a left control lever 15a and a right control lever 15b each swingable about a horizontal pivot axis extending transversely of the vehicle body. Around the driver's seat 11, the lawn mower further includes: a blade control lever 91, which may be alternatively a switch; a mower unit lift pedal 92a (alternatively it may be a mower unit lift lever 92 as shown in FIG. 2 also); and a cutting height adjustment dial 93.

As shown in FIG. 3, the lawn mower includes a left motor 21 and a right motor 22, which act as electric actuators, for rotating and driving the left drive wheel 2a and the right drive wheel 2b, respectively. The left motor 21 and the right motor 22 vary their rotating speeds independently of each other depending on electric power supplied via an inverter 4. Thus, the left drive wheel 2a and the right drive wheel 2b may rotate with different speeds, which allows the lawn mower to turn its direction. In the illustrated embodiment, the lawn mower further includes propelling drive devices 23 for power transmission between the left motor 21 and the left drive wheel 2a, and between the right motor 22 and the right drive wheel 2b.

A left rotating-speed detection sensor 71 acting as a left rotating-speed measurement unit detects rotating speed of the left motor 21 or the left drive wheel 2a, and a right rotating-speed detection sensor 72 acting as a right rotating-speed measurement unit detects rotating speed of the right motor 22 or the right drive wheel 2b. The vehicle body 10 includes a yaw rate detector 70 for detecting yawing of the vehicle body 10, and an acceleration sensor 73 for detecting an acceleration state of the vehicle body 10.

In the illustrated embodiment, the mower unit 3 is a side discharge type mower as shown in FIG. 3; and includes: a mower deck 3a; three rotatable cutting blades 30; and a blade driving device 31 for driving and rotating the cutting blades 30. The blade driving device 31 includes: a blade motor 32; and a blade drive power transmission 33 for transmitting drive power from the blade motor 32 to the cutting blades 30.

The mower deck 3a is formed by a ceiling surface and a vertical wall extending downward from a front edge of the ceiling surface. The three cutting blades 30 are rotatably supported by the mower deck 3a. Each cutting blade 30 has cutting edges formed at opposite ends thereof, and air-generating vanes formed behind the cutting edges. During mowing operation, grass clippings that have been cut by the cutting blades 30 are guided to a baffle plate by air generated by the air-generating vanes of the blades 30, and conveyed within the mower deck 3a toward one lateral side where a discharge outlet is provided to discharge the clippings laterally outside of the mower deck 3a.

Electric power is supplied to the left motor 21 and the right motor 22 for driving the lawn mower, and to the blade motor 32 for mowing operation, via the inverter 4 by inverter control through a controller 5 which is also referred to as "ECU."

Figure 4:
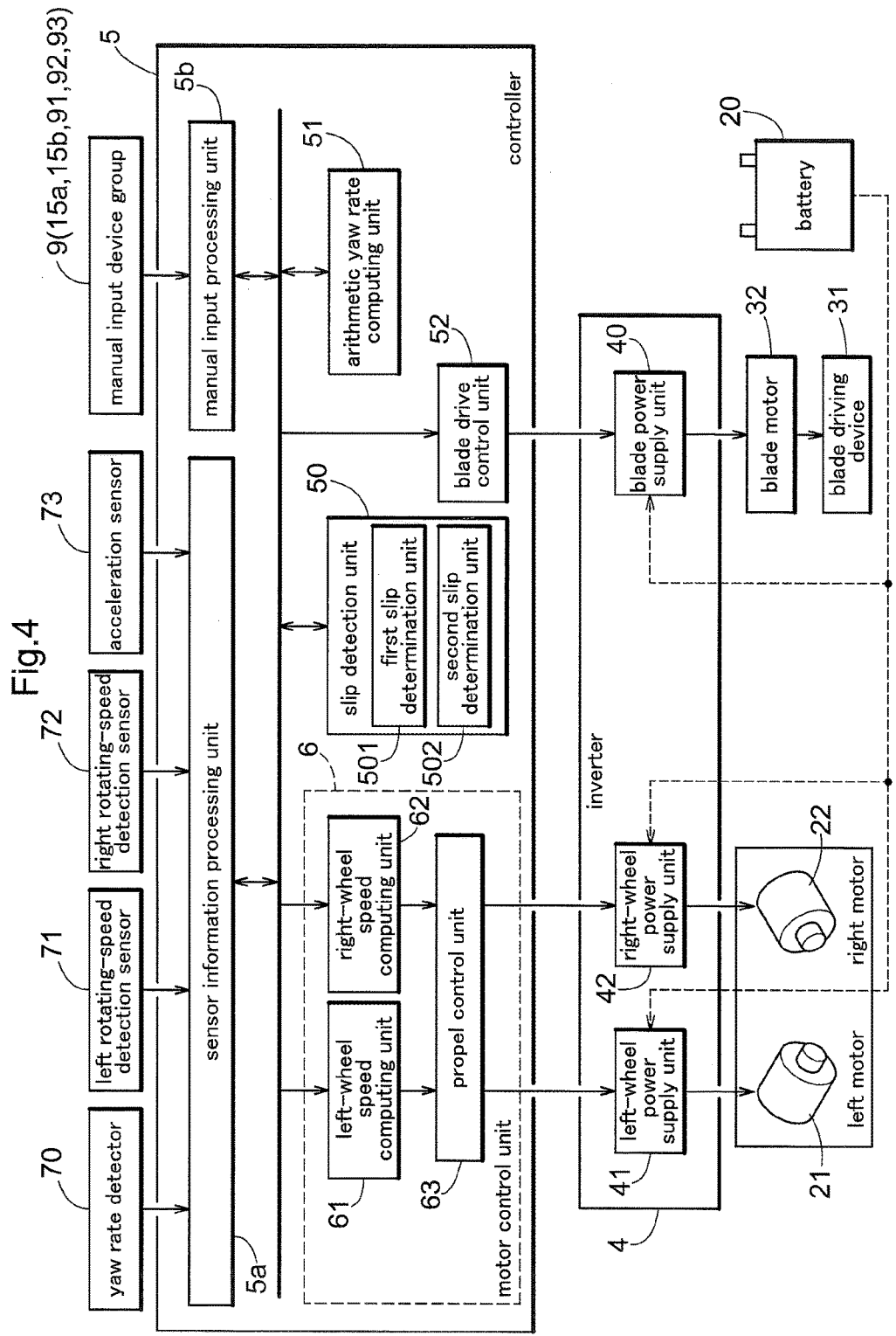
FIG. 4 is a functional block diagram of a control system of the electric lawn mower.

FIG. 4 shows a functional block diagram of a control system of the electric lawn mower. As shown, the control system includes state-detection devices such as the left rotating-speed detection sensor 71, acting as a left rotating-speed measurement unit, for detecting rotating speed of the left motor 21, and the right rotating-speed detection sensor 72, acting as a right rotating-speed measurement unit, for detecting rotating speed of the right motor 22 or the right drive wheel 2b. Further, there are provided the yaw rate detector 70 for detecting yawing of the vehicle body 10, and the acceleration sensor 73 for detecting an acceleration state of the vehicle body 10. The controller 5 receives signals from these state-detection devices via a sensor information processing unit 5a. The controller 5 also receives signals from various sensors, buttons, or switches for detecting operation states of the left control lever 15a, the right control lever 15b, or other devices, which are collectively referred to as a manual input device group 9 in FIG. 4, via a manual input processing unit 5b.

The controller 5, which acts as a core element of the control system, includes functional units such as a slip detection unit 50, an arithmetic yaw rate computing unit 51, a motor control unit 6 and a blade drive control unit 52. These functional units function basically through implementation of computer programs, and also may function through hardware at need. The sensor information processing unit 5a processes signals received from the yaw rate detector 70, the left rotating-speed detection sensor 71, the right rotating-speed detection sensor 72 and the acceleration sensor 73; and converts the signals to the information to be used within the controller 5. The manual input processing unit 5b processes sensor signals received from the manual-operation device group 9 and converts them to information usable within the controller 5.

The slip detection unit 50 and the arithmetic yaw rate computing unit 51 employ at least part of the functions described above with reference to FIG. 1. In the illustrated embodiment, the slip detection unit 50 includes a first slip determination unit 501 and a second slip determination unit 502. The arithmetic yaw rate computing unit 51 finds a signed difference between a rotating speed of the left motor 21 (rotating speed of the left drive wheel 2a) obtained based on a signal from the left rotating-speed detection sensor 71 and a rotating speed of the right motor 22 (rotating speed of the right drive wheel 2b) obtained based on a signal from the right rotating-speed detection sensor 72, and computes an arithmetic yaw rate based on the signed difference, to output the computed arithmetic yaw rate to the slip detection unit 50.

The slip detection unit 50 receives, in addition to the arithmetic yaw rate, an actual yaw rate corresponding to a signal from the yaw rate detector 70 and an acceleration rate of the vehicle body 10 corresponding to a signal from the acceleration sensor 73.

The first slip determination unit 501 finds a signed difference between the arithmetic yaw rate and the actual yaw rate (yaw-rate difference) to detect slipping of the left drive wheel 2a or the right drive wheel 2b based on the yaw-rate difference. In the illustrated embodiment, if the yaw-rate difference exceeds a predetermined upper threshold, then, the first slip determination unit 501 determines that the left drive wheel 2a or the right drive wheel 2b slips and also determines which of the drive wheels 2a or 2b slips based on a sign of the yaw-rate difference to produce a slip signal.

If the yaw-rate difference is small and the acceleration rate detected by the acceleration sensor 73 is smaller than the acceleration rate detected based on the rotating speed of the drive wheels, then, the second slip determination unit 502 determines that both of the left drive wheel 2a and the right drive wheel 2b slip to produce a slip signal.

The motor control unit 6 includes a left-wheel speed computing unit 61, a right-wheel speed computing unit 62 and a propel control unit 63. The left-wheel computing unit 61 finds a rotating speed of the left drive wheel 2a and thus a rotating speed of the left motor 21, based on steering information received through a left steering-angle detection sensor 74a for detecting a steering amount of the left control lever 15a operated by the driver. Likewise, the right-wheel computing unit 62 finds a rotating speed of the right drive wheel 2b and thus is a rotating speed of the right motor 22, based on steering information received through a right steering-angle detection sensor 74b for detecting a steering amount of the right control lever 15b operated by the driver.

The propel control unit 63 transmits a control signal to a left-wheel power supply unit 41 and a right-wheel power supply unit 42, which form the inverter 4 together, to supply required electric power to the left motor 21 and the right motor 22, to thereby achieve a target rotating speed for the left motor 21 determined by the left-wheel speed computing unit 61 and a target rotating speed for the right motor 22 determined by the right-wheel speed computing unit 62. Further, in response to a signal from the slip detection unit 50, at least one of the left-wheel speed computing unit 61 and the right-wheel speed computing unit 62 performs slip-containing control, such as increasing motor toque and/or reducing the rotating speed, against at least one of the left drive wheel 2a and the right drive wheel 2b which has been determined as being slipping. The inverter 4 also includes a blade power supply unit 40 for supplying electric power to the blade motor 32. The inverter 4 is connected to the battery 20 to supply required electric power to the left motor 21, the right motor 22 and the blade motor 32, Alternative Embodiments

[1] When both the left drive wheel 2a and the right drive wheel 2b slip to substantially the same degree, that is, when slipping occurs in both of the wheels, the vehicle speed changes but yawing hardly occurs. Thus, slipping cannot be detected based on the raw rate. In such a situation, the slipping of both the wheels is detected by referring to driving states of the left drive wheel 2a and the right drive wheel 2b and also referring to an actual change in speed of the vehicle body 10.

In view of this, when the actual yaw rate and the arithmetic yaw rate are below a lower threshold (that is, when the vehicle is intended to move straight), the slip detection unit 50 also may function to determine that both of the left drive wheel 2a and the right drive wheel 2b slip, based on detection results received from the acceleration sensor 73 detecting the acceleration of the vehicle body 10.

[2] If one of the drive wheels slips when the vehicle usually travels, the ground propelling force of the slipping wheel reduces to produce a difference between the arithmetic yaw rate and the actual yaw rate. On the other hand, if the driver attempts to move the vehicle straight with the left drive wheel 2a and the right drive wheel 2b being driven at the same rotating speed on a sloping ground, a difference is also produced between the arithmetic yaw rate and the actual yaw rate under the influence of gravity acceleration. In view of this, the slip detection unit 50 may additionally function to determine that the vehicle travels on the sloping ground if the actual yaw rate exceeds the arithmetic yaw rate.

[3] The work vehicle may be a front-mounted mower with the mower unit 3 being arranged in front of the front wheels, instead of the mid-mount mower in the foregoing embodiment, wherein the mower unit 3 is arranged between the front wheel unit and the rear wheel unit.

[4] The work vehicle may be a vehicle including a differential for connecting the left drive wheel 2a to the right drive wheel 2b, instead of the zero-turn radius vehicle in the foregoing embodiment, wherein the left drive wheel 2a and the right drive wheel 2b are driven independently of each other.

[5] The work vehicle may be a hybrid vehicle instead of the full-electric work vehicle in the foregoing embodiment.

What is claimed is:

1. An electric work vehicle comprising:
   a vehicle body including a steering operation unit;
   a left motor which supplies rotating power to a left drive wheel supporting the vehicle body to the ground;
   a right motor which supplies rotating power to a right drive wheel supporting the vehicle body to the ground;
   a motor control unit which provides drive signals to the left motor and the right motor independently of each other in response to an operation relative to the steering operation unit;
   a yaw rate detector which detects an actual yaw rate of the vehicle body;
   an arithmetic yaw rate computing unit which derives an arithmetic yaw rate based on a rotating speed of the left motor or the left drive wheel and a rotating speed of the right motor or the right drive wheel; and
   a slip detection unit detecting occurrence of slipping based on the arithmetic yaw rate and an actual yaw rate, wherein the slip detection unit determines that the electric work vehicle travels on a sloping ground if the actual yaw rate exceeds the arithmetic yaw rate.

2. The electric work vehicle according to claim 1, wherein the slip detection unit computes a difference between the actual yaw rate and the arithmetic yaw rate; and determines that slipping occurs if the difference is equal to or greater than an upper threshold.

3. The electric work vehicle according to claim 1, wherein the slip detection unit specifies which of the drive wheels slips based on a sign of the difference between the actual yaw rate and the arithmetic yaw rate.

4. The electric work vehicle according to claim 1, wherein when the actual yaw rate and the arithmetic yaw rate are below a lower threshold, the slip detection unit determines that both the left drive wheel and the right drive wheel slip based on detection results from an acceleration sensor which detects acceleration of the vehicle body.

5. An electric work vehicle comprising:
a vehicle body including a steering operation unit;
a left motor which supplies rotating power to a left drive wheel supporting the vehicle body to the ground;
a right motor which supplies rotating power to a right drive wheel supporting the vehicle body to the ground;
a motor control unit which provides drive signals to the left motor and the right motor independently of each other in response to an operation relative to the steering operation unit;
a yaw rate detector which detects an actual yaw rate of the vehicle body;
an arithmetic yaw rate computing unit which derives an arithmetic yaw rate based on a rotating speed of the left motor or the left drive wheel and a rotating speed of the right motor or the right drive wheel; and
a slip detection unit detecting occurrence of slipping based on the arithmetic yaw rate and an actual yaw rate, wherein the slip detection unit computes a difference between the actual yaw rate and the arithmetic yaw rate; and determines that slipping occurs if the difference is equal to or greater than an upper threshold.

6. The electric work vehicle according to claim 5, wherein the slip detection unit specifies which of the drive wheels slips based on a sign of the difference between the actual yaw rate and the arithmetic yaw rate.

7. The electric work vehicle according to claim 5, wherein when the actual yaw rate and the arithmetic yaw rate are below a lower threshold, the slip detection unit determines that both the left drive wheel and the right drive wheel slip based on detection results from an acceleration sensor which detects acceleration of the vehicle body.

\* \* \* \* \*